UNITED STATES PATENT OFFICE.

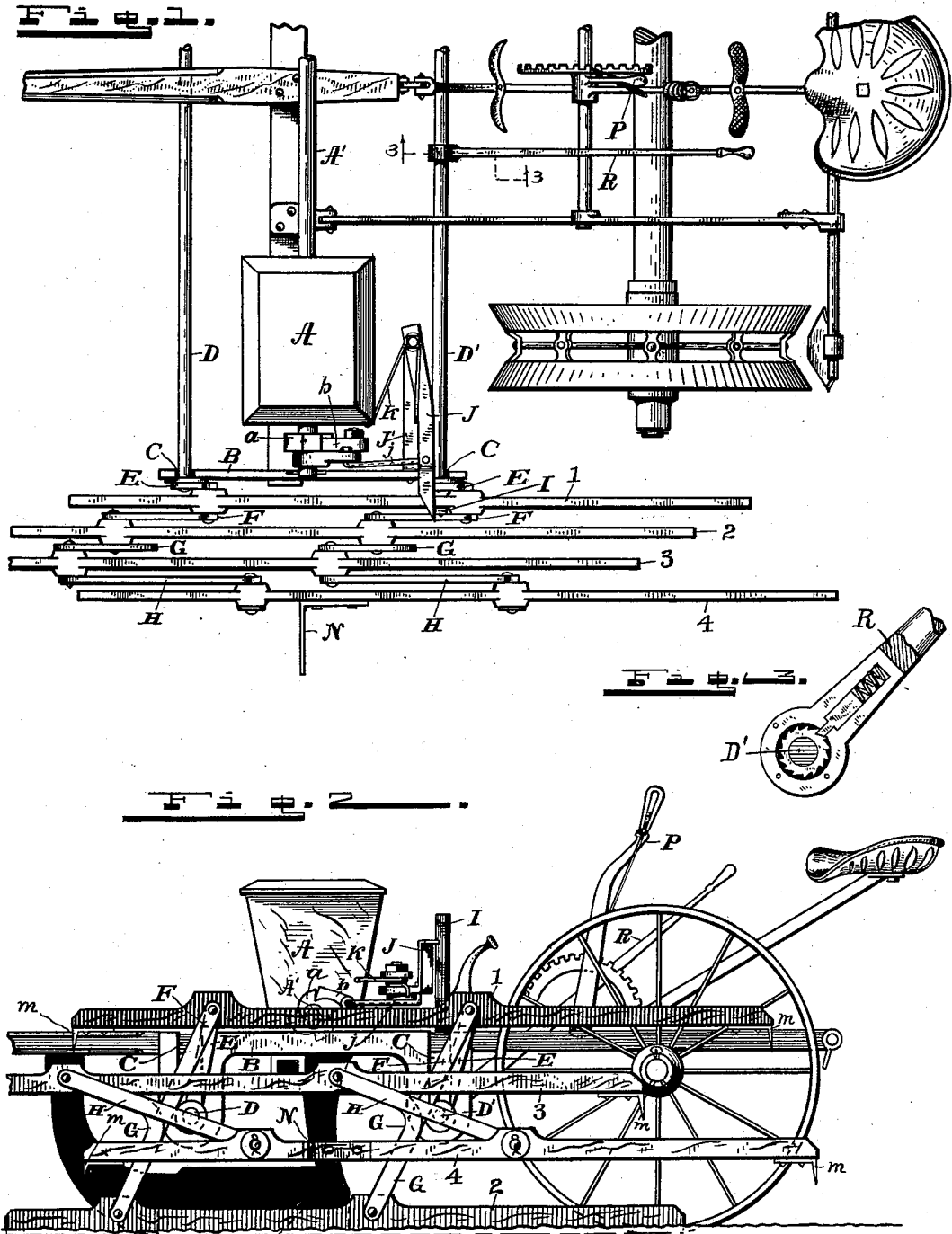

JOHN J. GAYNOR AND LEWIS A. SMITH, OF INDIANAPOLIS, INDIANA; SAID SMITH ASSIGNOR TO SAID GAYNOR; SAID GAYNOR ASSIGNOR OF ONE-HALF TO WILLIAM E. FISK, OF SAME PLACE.

CHECK-ROW ATTACHMENT FOR CORN-PLANTERS.

SPECIFICATION forming part of Letters Patent No. 568,607, dated September 29, 1896.

Application filed July 24, 1896. Serial No. 600,352. (No model.)

*To all whom it may concern:*

Be it known that we, JOHN J. GAYNOR and LEWIS A. SMITH, citizens of the United States, residing at Indianapolis, in the county of Marion and State of Indiana, have invented certain new and useful Improvements in Check-Row Attachments for Corn-Planters; and we do hereby declare the following to be a full, clear, and exact description of the invention, such as will enable others skilled in the art to which it appertains to make and use the same.

The object of this invention is to provide some means for automatically actuating the seed-dropping mechanism of a corn-planter, whereby the corn will be planted in check-rows without the necessity or use of a check-line such as has heretofore been employed.

Frequent attempts have been made to operate the dropping mechanism from the wheel of the planter, but owing to the uncertainty of action arising from the slipping of the wheel due to unevenness of the ground and to other irregularities which were impossible to overcome, such attempts have proved unsatisfactory and impractical. The object of this invention is to provide mechanism that will be independent of the wheel of the machine and that will not slip along the surface of the ground being planted, or that will be thrown out of its proper action by any unevenness of the surface over which the machine is passing.

We accomplish the objects of the invention by the mechanism illustrated in the accompanying drawings, in which—

Figure 1 is a detail in plan view showing one side of a corn-planter with our improved mechanism applied thereto. Fig. 2 is a view in side elevation of same, showing one of the bars broken off to bring the illustration within the limits of the sheet of drawings; and Fig. 3 is a detail showing the clutch mechanism by which the setting-lever of our mechanism is applied to the part on which it operates.

Similar letters and numerals of reference indicate like parts throughout the several views of the drawings.

A represents the seed-hopper, and A' the rotary shaft for working the disks through which the corn is dropped. These are of any usual construction, as also are all of the parts shown in the drawings, and which are not specially pointed out as new hereinafter.

As the arrangement of levers constituting our mechanism is a duplicate construction for the two sides of the planter, only one side will need to be described and shown in the drawings.

B represents metal frames, one of which is secured to each end of the front frame of the planter carrying the seedboxes. The frames B are placed parallel with the direction of movement of the planter across the field and terminate with U-shaped ends, which provide the slots C in which the transverse bars D and D' are held. The bars D and D' project beyond the frames B and terminate with the right-angled arms E, of equal length, and 1 is a bar which is pivotally secured to the ends of the arms E. 2 is a second bar of the same length and material as the bar 1 and is connected therewith by means of the two links F. A third bar 3 is secured to the bar 2 by means of the bent links G, and to the bar 3 a fourth bar 4 is secured by means of the links H. As previously stated, this arrangement of bars is duplicated on both sides of the planter and the two sets are connected by means of the bars D and D'.

The bars 1, 2, 3, and 4 will preferably be about six feet long, although they may be longer or shorter, if desired, and they will each be provided with under-side spurs $m$, the purpose of which is to penetrate the ground a sufficient distance to prevent longitudinal movement of the bars when any of them are resting on the ground.

The bars D and D' have rotary movement and also have vertical adjustment in the slots C, and the bars 1, 2, 3, and 4 are linked together and connected with the bars D and D' in such a manner that during each revolution of the bars D and D' each one of the four bars has, singly and in turn, been in contact with the ground, and the said bars are connected with each other and with the bars D and D', so that one of the four bars is always on the ground, with its spurs m entering, so as to prevent any longitudinal movement or "slipping."

It must be borne in mind that the bars 1, 2, 3, and 4 are not actuated from the planter-wheel, but are linked together in such a manner that when one of the bars is in contact with the ground and held from longitudinal movement by its spurs it will remain stationary while the planter is being drawn forward, and the necessary play for the links is provided by the slots C, which allow the bars D and D', to which the links are fastened, to rise and fall; but the changed position of the links resulting from the forward movement of the planter causes a second bar to approach the ground and its spurs to be forced therein, and the first bar will be raised out of contact with the ground. The progress of the planter across the field is a repetition of this movement. The dropping is accomplished by adding a mechanism that will give the proper movement to the rotary shaft A', which actuates the disks controlling the discharge of corn from the hopper.

As both seed-hoppers on all corn-planters are connected so they work in unison, it is only necessary in our attachment to provide this connection of the levers and hoppers on one side of the planter.

I is a vertical standard secured to the bar 1.

J is a lever pivotally secured at its inner end to a support J', fastened securely to the frame of the planter or to the frame B. The lever J projects out so as to cross the path of the standard I as it moves forward with its bar 1.

a is a ratchet-wheel on the end of the shaft A', and b is a dog or pawl working in the teeth of the ratchet-wheel. The dog b is connected with the lever J by means of the link j. A spring K returns the lever to its normal position after it is released from the standard I by the forward movement of the bar to which the standard is fastened.

In order to mark the hills where the corn is dropped, so the operator can tell when the hills are in alinement in a direction transversely to the movement of the planter across the field, a laterally-projecting arm N will be secured to the outermost bar 4 in such position that it will make an indentation in the soil opposite to the hill as dropped or in such relation to it that the operator, guided by the mark thus made, will be able to correct any errors in alinement.

If for any reason it was found that the planter was dropping out of alinement, the levers can be brought into position to insure correct work by raising the front of the planter above the ground by means of the lever P in the usual manner, after which the bars 1, 2, 3, and 4 can be moved into right position by hand. In order to facilitate this adjustment of the position of the bars 1, 2, 3, and 4, we will provide a lever R, which will be secured to the bar D' by means of a ratchet mechanism, as shown in detail in Fig. 3, and which will enable the bars 1, 2, 3, and 4, by properly rotating the bar D', to be moved into position to correct the defect in the alinement of the hills of dropped corn.

Having thus fully described our invention, what we claim as new, and wish to secure by Letters Patent of the United States, is—

1. The combination, with a machine for planting corn, of a plurality of parallel transverse bars having rotary movement and vertical adjustment, a plurality of horizontal bars having under-side spurs and arranged at right angles with the transverse bars and linked together in parallel series and arranged in duplicate on the two sides of the planter and connected with arms on the ends of the transverse bars whereby as the planter is drawn across the field one of the bars of each of the parallel series on both sides of the planter will always be in contact with the ground, means substantially as described for actuating the seed-slides in the hoppers from said last-mentioned bars, all substantially as described and for the purposes specified.

2. A check-row mechanism for corn-planters consisting of a double set of parallel bars arranged on opposite sides of the planter and connected by a pair of transverse bars having rotary and vertical movement, the double set of parallel bars each consisting of a plurality of bars hinged together in parallel series by means of links whereby each one of the bars will be brought in succession into contact with the ground and so one bar of each set will always be on the ground, said bars having under-side spurs for the purposes set forth, and means substantially as described for actuating the seed-slides in the hoppers from the bars alongside the planter.

3. In a check-row mechanism the frames B having the end slots C, the bars D and D' mounted in said slots, the bars 1, 2, 3, and 4, having the spurs m and linked together in the manner substantially as described and connected by means of the arms E with the bars D and D', the bar 4, having the marker N, and the bar 1 having the standard I, and means for actuating the slides in the seed-hoppers by the forward movement of the standard I, substantially as shown and described.

4. The combination with a corn-planter having seed-hoppers and slides working in said hoppers to drop the corn, of the frames B having the end slots C, the bars D and D' mounted in said slots, the lever R connected with the bar D' by means of a ratchet-wheel and pawl for the purposes set forth, the bars 1, 2, 3, and 4, having the spurs m and linked together in the manner substantially as described and connected by means of the arms E with the bars D and D', the bar 4 having the marker N and the bar 1 having the standard I, the lever J pivoted to the frame of the machine and projecting into the path of the standard I, a link connecting the lever J with the shaft that operates the seed-slides and a spring to bring the lever back into normal position after its release from the standard I, all substantially as described and for the purpose specified.

In testimony whereof we affix our signatures in presence of two witnesses.

JOHN J. GAYNOR.
LEWIS A. SMITH.

Witnesses:
JOSEPH A. MINTURN,
F. W. WOERNER.